United States Patent [19]

Shegrud et al.

[11] 4,102,469
[45] Jul. 25, 1978

[54] PROTECTED MOLDED RUPTURE DISC

[75] Inventors: Donald M. Shegrud; Kenneth R. Shaw, both of Kansas City, Mo.

[73] Assignee: Continental Disc Corporation, Riverside, Mo.

[21] Appl. No.: 799,203

[22] Filed: May 23, 1977

[51] Int. Cl.² ............................................. F16K 17/14
[52] U.S. Cl. .................................. 220/89 A; 137/68 R
[58] Field of Search ................... 220/63 R, 89 A, 207; 285/55, 226; 137/68 R

[56] References Cited

U.S. PATENT DOCUMENTS

| 2,123,662 | 7/1938 | Raymond | 220/89 A |
| 2,766,904 | 10/1956 | Philip | 137/68 R |
| 2,952,383 | 9/1960 | Paxton et al. | 220/89 A |
| 2,980,286 | 4/1961 | Coffman | 220/89 A |
| 3,215,307 | 11/1963 | Connell | 220/63 R |
| 3,415,544 | 12/1968 | Hucks, Jr. | 285/55 |
| 3,922,767 | 12/1975 | Solter et al. | 137/68 R |

FOREIGN PATENT DOCUMENTS

| 1,209,388 | 1/1966 | Fed. Rep. of Germany | 220/89 A |
| 1,138,885 | 1/1969 | United Kingdom | 137/68 R |

Primary Examiner—William Price
Assistant Examiner—Allan N. Shoap
Attorney, Agent, or Firm—Fishburn, Gold & Litman

[57] ABSTRACT

A safety pressure relief device of the rupture disc type includes a molded body rupture disc protected on surfaces exposed to a process line by combining with a protective liner or boot to prevent corrosion and inhibit temperature deterioration of the disc body, binder therein and/or leakage of materials therethrough. The liner, in one form, embraces the otherwise exposed surfaces of the rupture disc in absence of trapped air which is removed when the liner is engaged therewith. An alternate embodiment of the liner employs corrugated sides which flexibly and extendibly conform.

8 Claims, 4 Drawing Figures

U.S. Patent  July 25, 1978  4,102,469
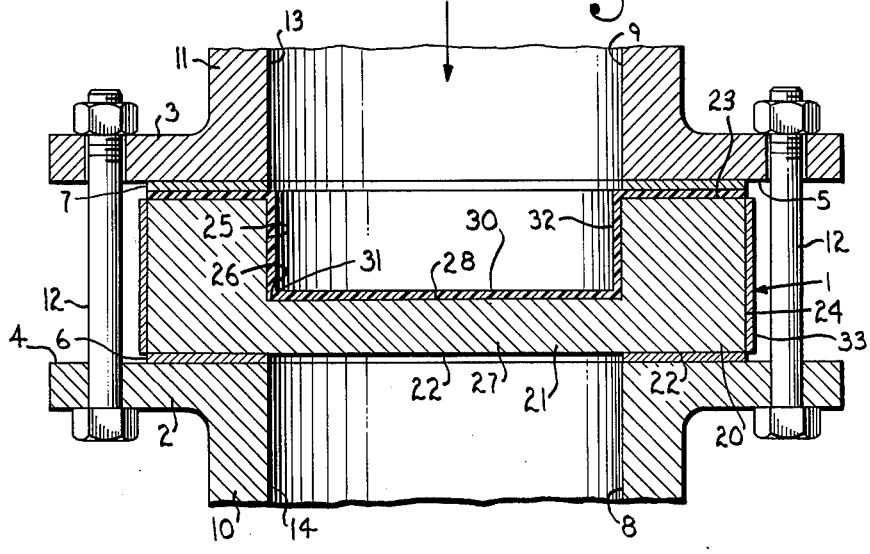
Fig. 1.
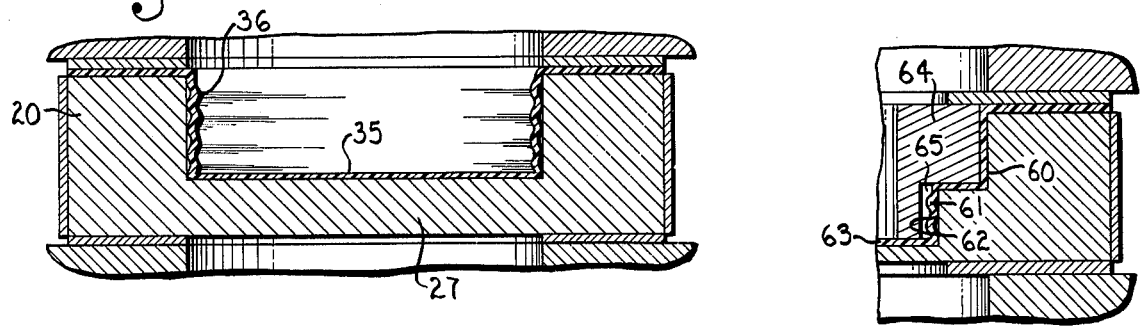
Fig. 2.
Fig. 4.
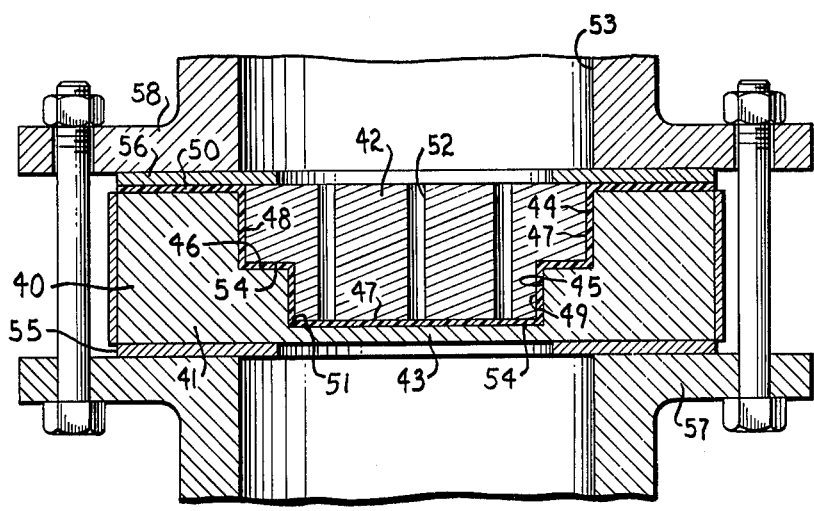
Fig. 3.

PROTECTED MOLDED RUPTURE DISC

This invention relates to safety pressure relief devices, and more particularly to improved molded type rupture discs.

Rupture discs have found increasing use as pressure relief devices. Although usually constructed of metal, for some applications such as high temperature exposure, compression molded discs of carbon, graphite or similar high temperature resistant materials are often used. Such molded rupture discs commonly have an axial bore or recess machined partly thereinto, retaining a bottom portion forming a frangible diaphragm, the thickness and diameter of which largely determines the rupture pressure of the disc. The disc is commonly mounted into the pressure line or vessel by insertion between standard ANSI pipe flanges.

The machining tolerances of the bore or recess are carefully controlled so that the diaphragm will rupture within a predicted range of pressure differential, for if the diaphragm ruptures prematurely, a large quantity of valuable product could be needlessly lost and if the diaphragm fails to rupture at the proper pressure, the pressure vessel may become endangered, resulting in the destruction of or damage to costly equipment. Carbon or graphite discs are preferred in certain high temperature applications because these materials are generally resistant to such temperatures as well as many corrosive chemicals. However, the binder often used for such discs are more likely to be affected, especially above about 450° F, thereby causing an unacceptable change in rupture pressure. Further, such discs as presently manufactured, tend to be slightly porous and fluids may slowly permeate therethrough with undesirable consequences.

The present invention seeks to overcome the above difficulties by utilizing, in combination with the molded disc, an impermeable, high temperature resistant liner exposed to the pressurized liquids or gases. The liner, in one form, conforms closely to the interior dimensions of the disc to avoid trapped air pockets which could function in a manner which partially adds the strength of the liner to that of the disc and thereby alter rupture pressure. In another form, the liner is corrugated in a manner whereby it may easily deflect and thereby not add appreciably to rupture strength of the disc.

The principal objects of the present invention are: to provide an improved molded disc assembly adapted for mounting between ANSI type flanges; to provide such a disc assembly having a liner preventing contact of corrosive materials to the disc surface; to provide such a disc assembly which is highly resistant to the leakage of materials therethrough; to provide such a disc assembly having a predictible rupture pressure rating; to provide such a molded disc assembly which may be quickly placed or replaced into operation without the need for highly skilled personnel; and to provide such an assembly which is relatively inexpensive, highly reliable in use and well adapted for its intended purpose.

Other objects and advantages of this invention will become apparent from the following description taken in connection with the accompanying drawings wherein are set forth by way of illustration and example, certain embodiments of this invention.

FIG. 1 is a vertical cross-sectional view showing a set of ANSI type flanges with a combination molded rupture disc and liner embodying this invention, interposed therebetween.

FIG. 2 is a vertical cross-sectional view illustrating a first modified form of disc combination utilizing a corrugated liner sleeve.

FIG. 3 is a vertical cross-sectional view showing a second modified form of the invention which includes a vacuum support utilized with a straight line sleeve.

FIG. 4 Is a fragmentary cross-sectional view illustrating a third modified form of the invention wherein a vacuum support is utilized with a corrugated liner sleeve.

Referring to the drawings in more detail:

The reference numeral 1, FIG. 1, generally indicates a safety pressure relief device embodying this invention. The device 1 is illustrated mounted directly between a pair or set of ANSI type flanges, comprising in this example, a lower flange 2 and an uppert flange 3 which are respectively characterized by opposed, flat, annular faces 4 and 5 having gaskets 6 and 7 thereagainst coaxially aligned with lower and upper bores 8 and 9 formed by flange body portions 10 and 11. The gaskets are preferably constructed of a suitable material for the enviroment, such as asbestos composition. A plurality of bolts 12 extend in a circular pattern through the flanges 2 and 3, drawing the respective flange faces 4 and 5 toward contacting relation.

In operation, the relief device 1 normally blocks flow of fluids or gases out of a process pressure relief passageway 13 formed by the bore 8. Upon actuation of the device 1 by rupture, a passageway 14 formed by the bore 8, carries the pressurized fluid out of the passageway 13 from a pressure vessel (not shown) to relieve excessive pressure, the direction of flow being indicated by the arrow, FIG. 1.

The device 1 comprises a rupture disc assembly 20 including a disc 21 composed of compression molded carbon, graphite or other sufficiently high temperature resistant moldable material. The disc 21 has flat, circular lower and upper faces 22 and 23 encircled by a cylindrical sidewall or rim 24. The upper face 23 is characterized by an axial bore 25 cut therethrough and extending a portion of the distance between the lower and upper faces 22 and 23, retaining a planar bottom portion forming a frangible diaphragm 27 with an upper face 28, the lower surface of which, in this example, forms part of the lower face 22. The thickness and diameter of the diaphragm 27 is associated with the predicted rupture pressure of the disc 21.

In manufacturing the disc 21, after the bore 25 is machined thereinto, the disc body is often impregnated with a resin binder and sealant which somewhat increases the strength of the disc, but has for its primary purpose the prevention of leakage therethrough, since the body otherwise tends to be porous. However, when the disc is in direact contact with material having temperatures in excess of 450° F the resin tends to burn or disintegrate from the disc, thereby weakening the structure and allowing leakage therethrough. Also, acids and/or solvents contacting the disc may tend to dissolve or corrode the resin binder with the same undesirable results.

To overcome the aforementioned problems a liner 30 (FIG. 1) is provided which conformably embraces the upper face 23 and the upper surface of the frangible diaphragm 27. The liner 30 includes a straight cylindrical sleeve portion 32 engaging the cylindrical wall of defining the bore 25 and a corner portion 31 tightly coextensively engaging the bottom inside circumference 26 of the bore 25. Thus, close, tight, fit of the liner 30 over exposed and sealing upper surfaces of the frangible diaphragm 27 is provided. As noted above, any air pockets between the liner and the disc surfaces, especially in the diaphragm forming area, may have the effect of causing the strength of the liner to be partially added to that of the disc. To avoid this, when the liner 30 is positioned into the bore 25, air bubbles, which often become trapped therebetween, may be removed by extending a thin, flexible, vacuum line (not shown) between the liner and the disc surfaces, and slowly withdrawing same. The raised liner channel left by the tube is pulled by air pressure into contact with the disc surfaces as the tube is withdrawn, leaving, essentially, full contact between the liner and the disc surfaces.

The liner 30 is preferably composed of Teflon or other suitable durable, easily applied, chemically stable, impermeable, high temperature resistant material, for example 0.010 inches thick, and capable of preventing contact of corrosive materials and the like with the disc 21. Available Teflon liner material is capable of exposure to temperatues up to approximatly 500° F without damage thereto, permitting a process temperature increase of approximately 50° F over the usual unprotected, resin impregnated disc, constituting a significant temperature advantage in certain applications. Further, when such a liner is employed, the disc 21 need not be impregnated with resin unless the resin-produced additional strength is desired in the particular application.

A band 33 of steel or like high tensile material preferably encircles the rim 24, preventing the bursting of materials through the rim should the disc become cracked because of mishandling or improper torquing of the bolts 12.

FIG. 2 depicts a modified form of rupture disc assembly wherein a liner 35 is similar to the liner 30, FIG. 1, except for a corrugated sleeve 36 which has axially spaced radial corrugations which easily axially flex and extend so as to present an insignificant increase in resistance to pressure caused disc deflection, and therefore to rupture, of the diaphragm 27, despite the presence of air pockets between the liner and the disc surfaces. This makes unnecessary the use of a vacuum line to remove trapped air described in connection with the embodiment of FIG. 1.

FIG. 3 illustrates a second modified form of this invention particularly suitable for use under low rupture pressure conditions, such as 15 psi differential, or less. In this embodiment, the disc assembly 40 includes a low pressure molded disc 41 with a vacuum support 42 received thereinto and which may be of similar material, for protecting a thin frangible disc diaphragm 43 from transient vacuums or reverse differentials which commonly occur in process systems and can rupture an unsupported low pressure disc. The low pressure disc 41 has therein a bore 44 and a concentric bore 45 of lesser diameter, the juncture of the two bores forming a shoulder or step 46. A liner 47, having straight sleeves 48 and 49, closely embraces the surface 50 of the disc upper face, the wall of the bore 44, the step 46, the wall of the bore 45, the inner corner 51 and upper surface of the frangible diaphragm 43. In assembling the liner 47 with the disc, any trapped air may be removed by the vacuum line method as described in connection with FIG. 1.

The vacuum support 42 fits into the lined bores 44 and 45, and has a plurality of passageways or channels 52 therethrough for communication of pressure between the pressure relief passageway 53 and the frangible diaphragm 43. A circumferential shoulder 54 on the vacuum support 42 rests upon the liner 47 at the step 46 and prevents the bottom 54 of the vacuum support from exerting unwanted pressure upon the frangible diaphragm 43, which could affect diaphragm rupture pressure. Lower and upper gaskets 55 and 56 are emplaced against the lower and upper flanges 57 and 58, the upper gasket 56 extending partially over the periphery of the top of the vacuum support 42, thereby retaining same in proper position.

FIG. 4 is a fragmentary view of a further modified form of the invention which combines a low pressure rupture disc assembly, of the type described in connection with FIG. 3, and a corrugated side sleeve liner as described in connection with FIG. 2. The liner 60, FIG. 4, thus exhibits a corrugated sleeve 61 flexibly and extendibly projecting into the lesser diameter bore 62 and connecting with a diaphragm contacting portion 63. The vacuum support 64 is of substantially lesser diameter than the bore 62 where adjacent thereto, thus providing adequate space 65 for the free flexing of the corrugated sleeve 61.

It is to be understood that while certain forms of this invention have been illustrated and described, it is not to be limited thereto except insofar as such limitations are included in the following claims.

We claim:
1. A pressure relief assembly for exposure to adverse process conditions comprising:
 (a) a disc having a molded body with an upper face, a lower face and a rim;
 (b) at least one bore extending downwardly through said upper face and into said body, said bore having a depth less than the distance between said upper face and said lower face, forming a cylinddrical bore wall and a planar bore bottom face; said bore wall and said bottom face forming a bottom circumference at the juncture thereof;
 (c) said bottom face forming one face of a frangible diaphragm designed to rupture within a predicted range of pressure differential thereacross; and
 (d) an impermeable, high temperature resistant liner coextensively engaging said bottom circumference and said bottom face thereby forming a coextensive combination wherein said liner is characterized by lack of resistance to deflection of said frangible diaphragm to the point of diaphragm rupture.

2. A pressure relief assembly for exposure to adverse process conditions comprising:
 (a) a disc having a molded body with an upper face, a lower face and a rim;
 (b) at least one bore extending downwardly through said upper face and into said body, said bore having a depth less than the distance between said upper face and said lower face, forming a cylindrical bore wall and a planar bore bottom face; said bore wall and said bottom face forming a bottom circumference at the juncture thereof;
 (c) said bottom face forming one face of a frangible diaphragm designed to rupture within a predicted range of pressure differential thereacross; and
 (d) a protective axially flexive liner having axially spaced radial corrugations extending axially into said bore and having a bottom portion engaging said bottom face with said corrugations partially extended axially toward said bottom so as to have minimal resistance to differential pressure between said liner bottom portion and said bottom face.

3. The pressure relief assembly as set forth in claim 1 wherein:
   (a) said molded body is composed of carbon.
4. The pressure relief assembly as set forth in claim 1 wherein:
   (a) said molded body is composed of graphite.
5. A pressure relief assembly for exposure to adverse process conditions comprising:
   (a) a disc having a molded body with an upper face, a lower face and a rim;
   (b) at least one bore extending downwardly through said upper face and into said body, said bore having a depth less than the distance between said upper face and said lower face, forming a bore bottom face;
   (c) said bottom face forming one face of a frangible diaphragm designed to rupture within a predicted range of pressure differential thereacross;
   (d) a protective liner in said bore whereby said frangible diaphragm is protected against exposure to said adverse process conditions;
   (e) said bore including axial portions of different diameter forming a shoulder therebetween;
   (f) a portion of said liner engaging said shoulder; and
   (g) a vacuum support resting on said last named liner portion.
6. The pressure relief assembly as set forth in claim 5 wherein:
   (a) said liner embraces the side wall of the axial bore portion adjacent said bottom face.
7. The pressure relief assembly as set forth in claim 5 wherein:
   (a) said liner includes a corrugated sleeve portion flexibly extending between said shoulder and said bottom face.
8. A protected molded rupture disc assembly as set forth in claim 5 wherein:
   (a) said vacuum support is of molded construction.

* * * * *